UNITED STATES PATENT OFFICE.

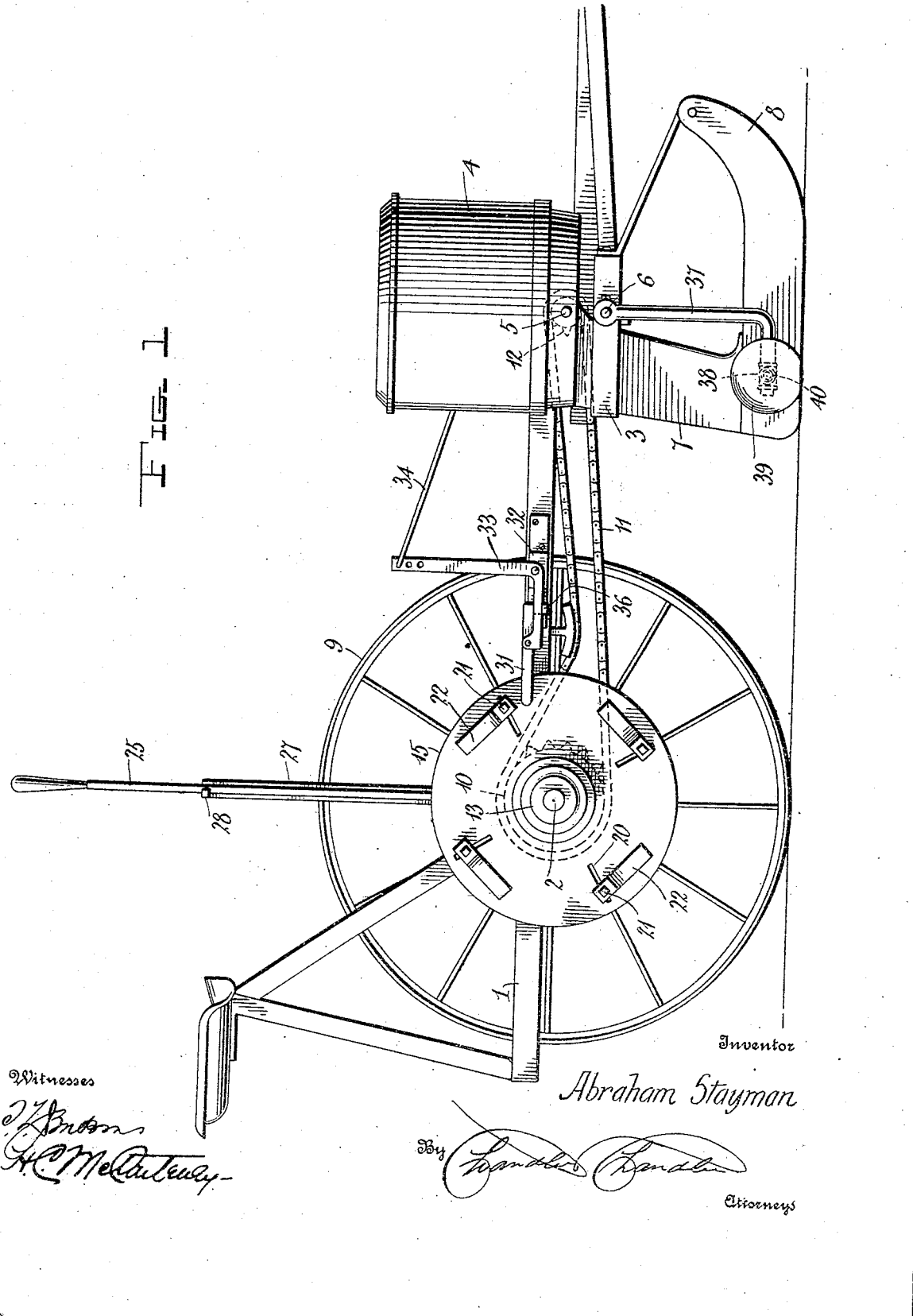

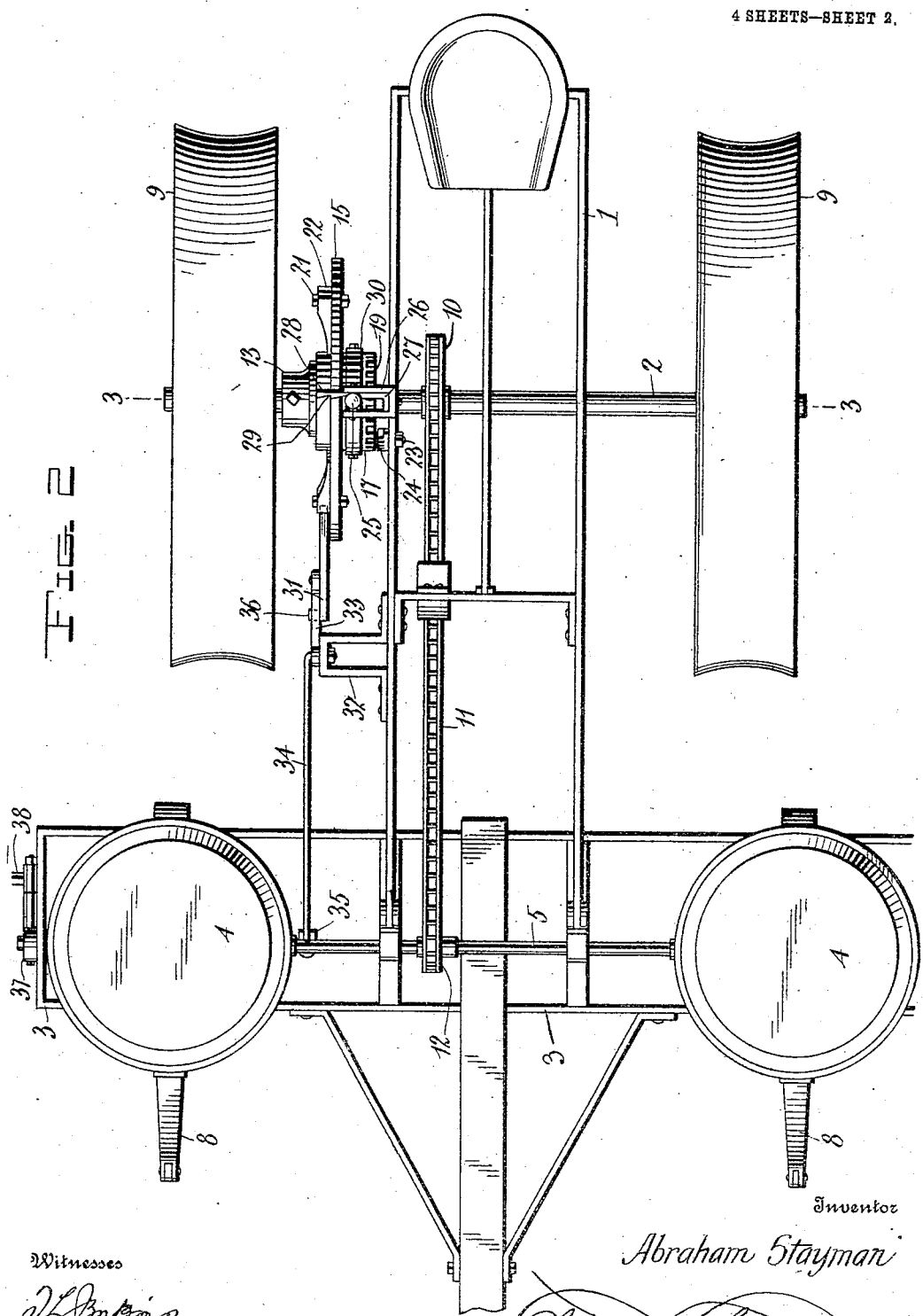

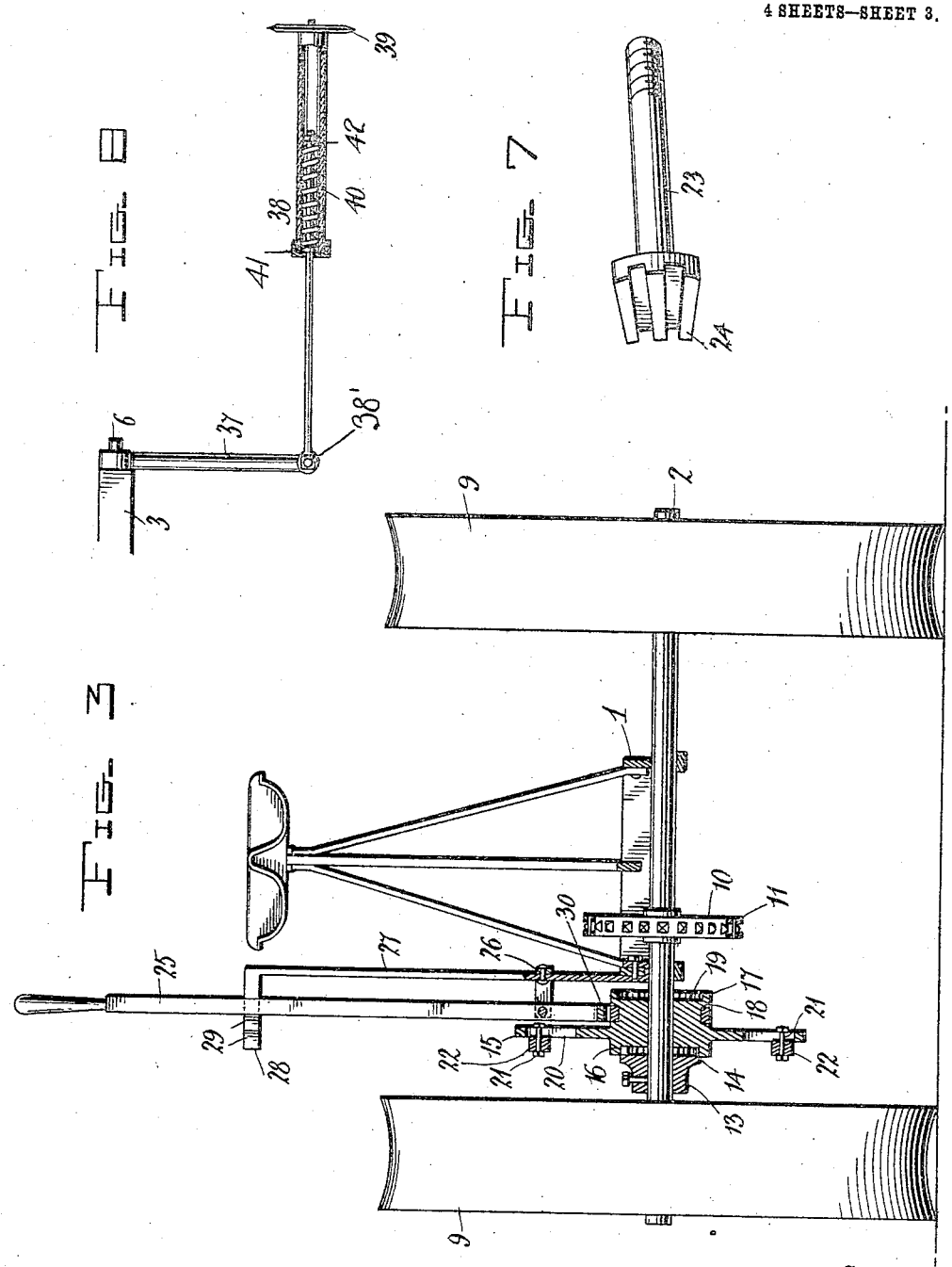

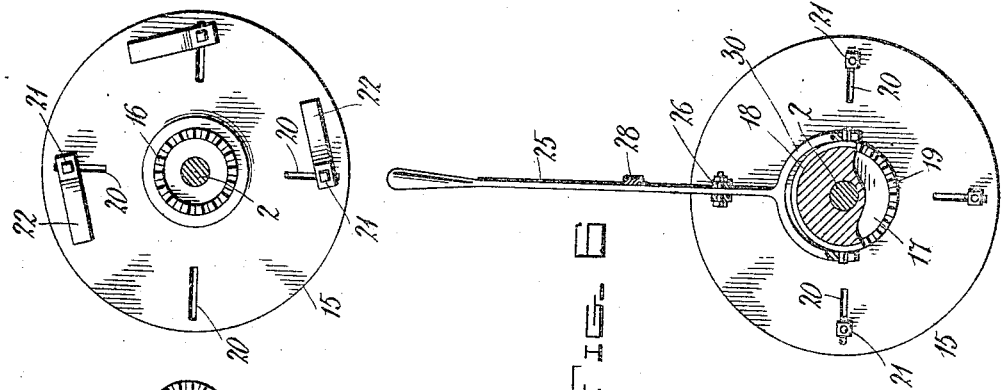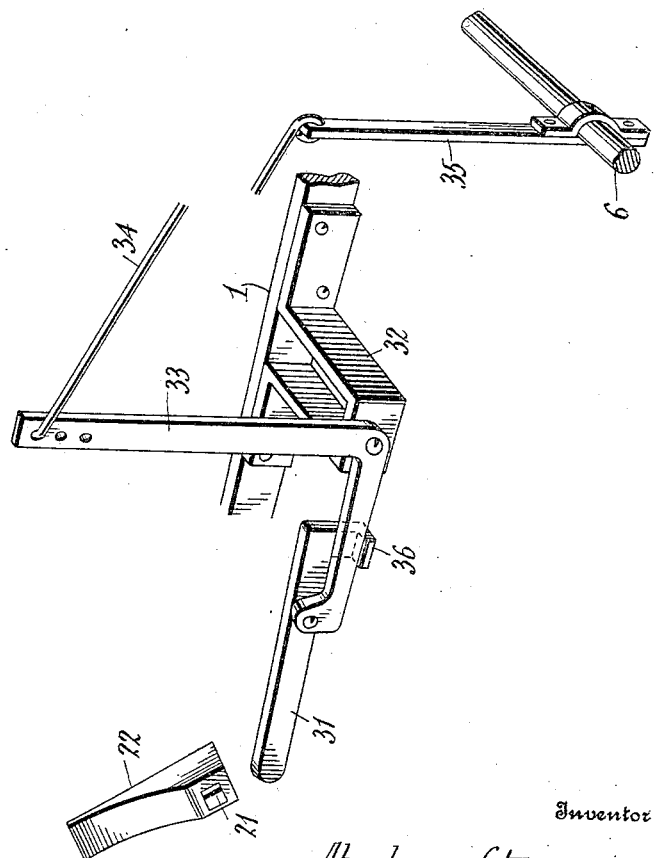

ABRAHAM STAYMAN, OF PLEASANT HOPE, MISSOURI.

CHECK-ROW CORN-PLANTER.

943,713.   Specification of Letters Patent.   Patented Dec. 21, 1909.

Application filed September 10, 1908. Serial No. 452,434.

*To all whom it may concern:*

Be it known that I, ABRAHAM STAYMAN, a citizen of the United States, residing at Pleasant Hope, in the county of Polk, State of Missouri, have invented certain new and useful Improvements in Check-Row Corn-Planters; and I do hereby declare the following to be a full, clear, and exact description of the invention, such as will enable others skilled in the art to which it appertains to make and use the same.

The present invention has reference to improvements in check-row corn planters. In planters of this type, as ordinarily constructed, it has been found necessary for the driver, upon reaching the end of a furrow, to alight from the machine, unfasten the check-wire and remove the anchor, before turning the machine into position to travel along the succeeding furrow, the wire being subsequently re-fastened, the several operations occasioning considerable delay, in the aggregate, during the planting of a field.

It is the principal object of this invention, therefore, to provide a planter which, while being at least equally as efficient as the machines which include check wires, is much more simple in its construction, inasmuch as the necessity for the use of the check-wire is overcome by the employment of a simple device which is connected with the dropper shaft and is automatically actuated at predetermined intervals to effect a discharge of seeds from the boot or boots.

To this end, the invention generally comprises a disk attached to the axle of the machine and provided with a series of lugs or cams arranged at equal distances from each other, these lugs being adapted to successively engage and actuate a bell-crank lever, one arm of which being connected to an arm carried by the operating shaft for the seed boxes and the novelty of the invention especially residing in the particular construction of the lever, in the particular manner in which the lugs are secured to the disk, and in the particular devices employed for shifting the latter into and out of engagement with a clutch member likewise carried by the axle of the machine.

The preferred embodiment of the invention is illustrated in the accompanying drawings, in which corresponding parts or features, are designated by the same reference characters throughout the several views.

Of the said drawings, Figure 1 is a side elevation of the complete invention, one of the supporting wheels being removed. Fig. 2 is a plan view. Fig. 3 is a transverse section taken on the line 3—3 of Fig. 2. Fig. 4 is an enlarged detail view of the bell-crank lever. Fig. 5 is a collective view of the disk and the collar with which it is arranged for engagement, one of the lugs being omitted from the disk, to illustrate the slot formed therein. Fig. 6 is a reverse view of the disk, illustrating the teeth formed on its hub. Fig. 7 is an enlarged detail view of the toothed bolt. Fig. 8 is an enlarged detail view partly in section of the marker carried by the operating shaft.

Referring more particularly to the drawings, 1 designates generally the main rectangular frame of the machine which carries the axle 2, and 3 a second or supplemental frame of similar shape, which supports the runners or furrow openers 8 and is secured to the front member of the main frame, the length of the last-mentioned frame being such that it extends at opposite ends beyond the sides of the main frame, as shown in Fig. 2. This frame 3 carries the dropper mechanism which may be of any preferred type, including the seed boxes 4, and upper and lower transverse shafts 5 and 6, the shaft 5 being operatively connected with the dropper plates (not shown).

The axle 2 upon whose ends are mounted the supporting wheels 9, carries a sprocket 10 connected by a chain 11 with a smaller sprocket 12 secured to the shaft 5, the rotation of the axle thus effecting the rotation of said shaft and the consequent movement of the dropper plates above referred to, the registration of the openings in said plates with the openings in the bottom of the boxes, permitting the grains of corn to pass into the boots. These plates, as well as the valves in the boots, are of the ordinary construction, as above stated, and illustration thereof is for this reason omitted. The axle is further provided with a collar 13 held in adjusted position by a set screw or similar device, and having an annular series of teeth 14 formed on its inner face, and with a disk 15 slidable loosely thereon toward and from the collar, as hereinafter described. The outer face of this disk is formed with a bushing in which is cut an annular series of teeth 16 arranged for engagement with the teeth 14, while the inner face of said disk is provided with an integral hub 17 in which a circumscribing groove 18 is formed, the outer face of the hub being in turn toothed, as indicated by the numeral 19. In addition, the disk 15 has formed therein a series of equi-distant slots 20, through which extend the bolts 21, by means of which a series of tapered lugs 22 are fastened to the outer face of the disk, the provision of the slots permitting a slight adjustment of said lugs, as will be apparent. The side member of the main frame adjacent the disk 15 has secured thereto a laterally-projecting bolt 23 having a toothed head 24, said bolt being located directly opposite the teeth 19 formed upon the hub 17. Owing to this construction, it will be obvious that the disk may be shifted in one direction upon the axle to effect the engagement of its teeth 16 with the teeth 14 formed on the collar 13, and in the other direction to engage the toothed head of the bolt 23 with its teeth 19, said disk being caused to rotate when in the first-mentioned position, and being held against rotation when in the last-mentioned position. The shifting movement of the disk is effected by means of a lever 25 pivoted adjacent its lower end to a lateral finger 26 formed upon the lower portion of a vertical rod 27 whose extreme lower end is rigidly secured to the adjacent side member of the main frame. The extreme upper end of the rod 27 is bent laterally in the same direction as the finger 26, said bent end which is designated by the numeral 28 being provided with a series of notches 29, which serve to retain the lever 25 in one position or the other. The extreme lower end of the lever is provided with a yoke 30 which straddles the hub 17 and fits in the groove 18 formed in the latter, the free ends of the legs of the yoke being secured in said groove in any preferred manner.

When the disk 15 has been shifted into its operative position, i. e., in engagement with the toothed collar 13, its lugs 22 lie in the path of motion of and are arranged to successively engage the free end of the horizontal arm 31 of a bell-crank lever pivoted at its apex to a bracket 32 which projects laterally from and is secured to the adjacent side member of the frame 3. The vertical arm 33 of this lever is directly connected by a stiff wire link 34 to the free end of an arm 35, which projects laterally from and is rigidly connected to the valve-operating shaft 6, said shaft being termed hereinafter the operating shaft. The horizontal arm 31 of the bell-crank lever is preferably formed in two sections, as shown in Fig. 4, said sections being pivoted together at their mutually-adjacent inner ends, the inner end of the outer section of said arm terminating in a finger 36 which rests on the inner section. This construction permits said outer section to be swung outwardly without effecting the actuation of the bell-crank levers when the disk is rotated reversely in the event of any backward movement of the machine as a whole.

The operating shaft extends at its right hand end beyond the adjacent end of the frame 3 and is provided at such point with a crank-arm 37 attached thereto by a set screw or similar device. This arm is formed with a reduced outer end arranged to be received in a socket formed in the side of a tubular member 38, said member having slidably fitted thereon the stem of a marker 39, which is yieldingly held at the limit of its outward movement by means of an expansible coil spring 40. This spring is located within the interior of the member 38, bearing at one end against a shoulder 41 carried by the stem and at the other end against an interiorly located partition plate 42 formed with an axial opening through which said stem extends. The attachment between the crank-arm and the member 38 is likewise effected by means of a lock nut 38′ which is carried by the latter and is arranged to impinge against the reduced end of the crank arm, such construction permitting an adjustment of said member and the marker carried thereby, as will be apparent, the rotation of the crank-arm effecting the actuation of the marker.

During the travel of the machine over the ground to be planted, it will be apparent that when the disk 15 which forms the sliding clutch member is engaged with the fast collar or clutch member 13, the successive contact of the lugs 22 with the end of the horizontal arm of the bell-crank lever will rock the latter upon its pivot, the movement of said lever opening the boot valves at predetermined intervals, thus permitting the grains to be discharged from the boots into the hills. When the end of the row is reached, the disk is thrown out of engagement with the fast clutch member. The machine is then turned around, until its boots aline with the last mark made by the marker blade, after which the disk is then revolved manually or otherwise, until one of the lugs 22 rests upon the free end of the horizontal arm of the bell-crank lever in position to actuate the latter. The disk is then reëngaged with the fast clutch member. The cross rows thus formed will be uniform, as will be obvious.

Further description of the operation of the invention is deemed unnecessary in view of the foregoing.

What is claimed is:

1. In a planter, the combination of a frame; an axle and an operating shaft carried by the frame; a disk carried by the axle and provided with radially disposed elongated slots, lugs adjustably connected in said slots; a bell-crank lever pivotally connected with the frame, a trip arm pivoted to one of the arms of the lever and normally extending to the path of movement of the lugs, for actuation thereby, during the rotation of the disk in one direction; an arm secured to the operating shaft; and a member connected at its opposite ends to the last-mentioned arm and the other arm of the lever, for actuating the operating shaft when the lever is rocked.

2. In a planter, the combination of a frame; an axle and an operating shaft carried by the frame; a clutch member fast upon the axle; a disk slidable upon the axle and having one face thereof formed with a clutch surface and provided with radially disposed slots; lugs adjustably connected in said slots; means for shifting the disk upon the axle, to move its clutch surface into and out of engagement with said clutch member; a bell-crank lever pivotally connected with the frame and having one of its arms extending into the path of movement of the lugs, for actuation thereby during the rotation of the disk; an arm secured to the operating shaft; and a member connected at its opposite ends to the last mentioned arm and the other arm of the lever, for actuating the operating shaft when the lever is rocked.

3. In a planter, the combination of a frame; an axle and an operating shaft carried by the frame; fast and loose clutch members carried by the axle, the loose clutch member being formed on one face with a series of lugs and on the other face with a toothed hub; a toothed member secured to the frame directly opposite said hub; a lever for shifting said loose clutch member into engagement with the fast clutch member or with said toothed member, to rotate said loose clutch member or hold the same against rotation; a two-armed rocking member pivotally connected with the frame, and having one of its arms extending into the path of movement of the lugs, for actuation thereby, during the rotation of the disk; an arm secured to the operating shaft; and a member connected at its opposite ends to the last-mentioned arm and the other arm of the lever, for actuating the operating shaft when the lever is rocked.

4. In a planter, the combination of a frame, an axle and an operating shaft carried by the frame; fast and loose clutch members carried by the axle, the loose clutch member being formed on one face with a series of lugs, and on the other face with a toothed hub; a laterally-projecting bolt secured to the frame directly opposite said hub, said bolt being formed with a toothed head; a lever for shifting said loose clutch member into engagement with the fast clutch member or with the toothed head of said bolt, to rotate said loose clutch member or hold the same against rotation; a two-armed rocking member pivotally connected with the frame, and having one of its arms extending into the path of movement of the lugs, for actuation thereby, during the rotation of the disk; an arm secured to the operating shaft; and a member connected at its opposite ends to the last-mentioned arm and the other arm of the lever, for actuating the operating shaft, when the lever is rocked.

In testimony whereof, I affix my signature, in presence of two witnesses.

ABRAHAM STAYMAN.

Witnesses:
   Wm. C. Goodnight,
   R. W. H. Rymer.